United States Patent
Ting

(10) Patent No.: US 8,259,063 B2
(45) Date of Patent: Sep. 4, 2012

(54) INPUT METHOD OF POINTER INPUT SYSTEM

(75) Inventor: Li-Wen Ting, Toufen Township (TW)

(73) Assignee: Primax Electronics Ltd., Taipei (TW)

( * ) Notice: Subject to any disclaimer, the term of this patent is extended or adjusted under 35 U.S.C. 154(b) by 1259 days.

(21) Appl. No.: 11/753,983

(22) Filed: May 25, 2007

(65) Prior Publication Data

US 2007/0290995 A1 Dec. 20, 2007

(30) Foreign Application Priority Data

Jun. 1, 2006 (TW) ................................. 95119474 A

(51) Int. Cl.
*G09G 5/00* (2006.01)
(52) U.S. Cl. ........................................ 345/156; 345/157
(58) Field of Classification Search .......... 345/156–159, 345/173–183; 348/734; 463/37–38
See application file for complete search history.

(56) References Cited

U.S. PATENT DOCUMENTS

| | | | | |
|---|---|---|---|---|
| 4,280,135 | A * | 7/1981 | Schlossberg | 348/61 |
| 5,181,015 | A * | 1/1993 | Marshall et al. | 345/156 |
| 5,504,501 | A * | 4/1996 | Hauck et al. | 345/158 |
| 5,515,079 | A * | 5/1996 | Hauck | 345/157 |
| 5,572,251 | A * | 11/1996 | Ogawa | 348/207.99 |
| 5,691,513 | A * | 11/1997 | Yamamoto et al. | 178/18.07 |
| 5,914,783 | A * | 6/1999 | Barrus | 356/614 |
| 6,050,690 | A * | 4/2000 | Shaffer et al. | 353/122 |
| 6,317,118 | B1 * | 11/2001 | Yoneno | 345/158 |
| 6,704,000 | B2 * | 3/2004 | Carpenter | 345/158 |
| 6,729,731 | B2 * | 5/2004 | Gnanamgari et al. | 353/42 |
| 6,766,066 | B2 * | 7/2004 | Kitazawa | 382/291 |
| 6,788,289 | B2 * | 9/2004 | Kitazawa | 345/158 |
| 6,791,531 | B1 * | 9/2004 | Johnston et al. | 345/157 |
| 6,795,061 | B2 * | 9/2004 | Tanaka | 345/175 |
| 6,829,394 | B2 * | 12/2004 | Hiramatsu | 382/291 |
| 6,963,331 | B1 * | 11/2005 | Kobayashi et al. | 345/158 |
| 6,965,378 | B2 * | 11/2005 | Tanaka | 345/179 |
| 2001/0022575 | A1 | 9/2001 | Woflgang | |
| 2003/0011566 | A1 | 1/2003 | Gomi et al. | |
| 2003/0021492 | A1 | 1/2003 | Matsuoka et al. | |
| 2005/0083249 | A1 * | 4/2005 | Jeng | 345/56 |
| 2006/0139338 | A1 * | 6/2006 | Robrecht et al. | 345/175 |
| 2008/0192017 | A1 * | 8/2008 | Hildebrandt et al. | 345/173 |
| 2009/0040195 | A1 * | 2/2009 | Njolstad et al. | 345/180 |

FOREIGN PATENT DOCUMENTS

| | | | |
|---|---|---|---|
| EP | 1037163 | | 9/2000 |
| JP | 03046535 | * | 2/1991 |
| JP | 2003-101395 | * | 4/2003 |

* cited by examiner

*Primary Examiner* — Duc Dinh
(74) *Attorney, Agent, or Firm* — Kirton McConkie; Evan R. Witt

(57) ABSTRACT

The present invention relates to an input method of a pointer input system. A setting procedure and a correcting procedure having been performed on the pointer input system to obtain a space conversion relationship and an over-bright position. The input method includes steps of inputting at least a light spot into a projection screen, capturing the light spot by a photosensing system to obtain a light-spot image, recognizing at least a relevant light spot of the light-spot image by checking whether the light-spot image excluding the over-bright position complies with a light-spot characteristic situation so as to obtain at least a light-spot data, and converting the at least a light-spot data into at least an input data of a data processing system according to the space conversion relationship.

24 Claims, 19 Drawing Sheets

INPUT METHOD OF POINTER INPUT SYSTEM

FIELD OF THE INVENTION

The present invention relates to an input method, and more particularly to an input method of a pointer input system.

BACKGROUND OF THE INVENTION

Conventionally, pointer input devices such as keyboards, mice, trackballs, light pens and touch screens become essential peripheral input devices of information systems for allowing the users to input signals therevia. The above pointer input devices, however, have respective disadvantages and limitations. For example, the trackballs are not suitable to write onto upright-type large-sized screens. The light pens may only work with scan type monitors such as cathode ray tube (CRT) monitors, but not work with LCD screens, projectors or other display devices. A large-sized touch screen has problems of poor alignment and inconvenience for portability. As for the optical sensors used in the conventional optical pointer systems, image distortion such as barrel distortion or pincushion distortion is commonly encountered in the optical lens. Unfortunately, the effect of correcting the image distortion is often disappeared in the case of careless collision with the optical lens.

Nowadays, for most upright-type large-sized projection screens, a single keyboard and a mouse are used with the computer system to control the input pointer. As known, it is difficult to implement multi-input or opinion exchange by a single input device.

Therefore, there is a need of providing an input method of a pointer input system having the advantages of easy correction, excellent alignment and high resolution.

SUMMARY OF THE INVENTION

It is an object of the present invention to provide an input method of a pointer input system.

Another object of the present invention provides a setting method of a pointer input system.

A further object of the present invention provides a correcting method of a pointer input system.

In accordance with an aspect of the present invention, a setting procedure and a correcting procedure having been performed on the pointer input system to obtain a space conversion relationship and an over-bright position. The input method includes steps of inputting at least a light spot into a projection screen, capturing the light spot by a photosensing system to obtain a light-spot image, recognizing at least a relevant light spot of the light-spot image by checking whether the light-spot image excluding the over-bright position complies with a light-spot characteristic situation so as to obtain at least a light-spot data, and converting the at least a light-spot data into at least an input data of a data processing system according to the space conversion relationship.

In accordance with another aspect of the present invention, the setting method includes steps of inputting a first frame to a projection screen, capturing the first frame by a photosensing system to obtain a first image, and analyzing the color information of the first image to realize an over-bright position.

In accordance with a further aspect of the present invention, the correcting method includes steps of inputting at least a reference frame including plural reference points into a projection screen, capturing the reference frame by a photosensing system to obtain a reference image, recognizing relevant reference points of the reference image corresponding to the reference points of the reference frame according to a color critical value, and comparing the recognized relevant reference points with predetermined reference data, thereby discriminating a space conversion relationship between the projection screen and the photosensing system.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
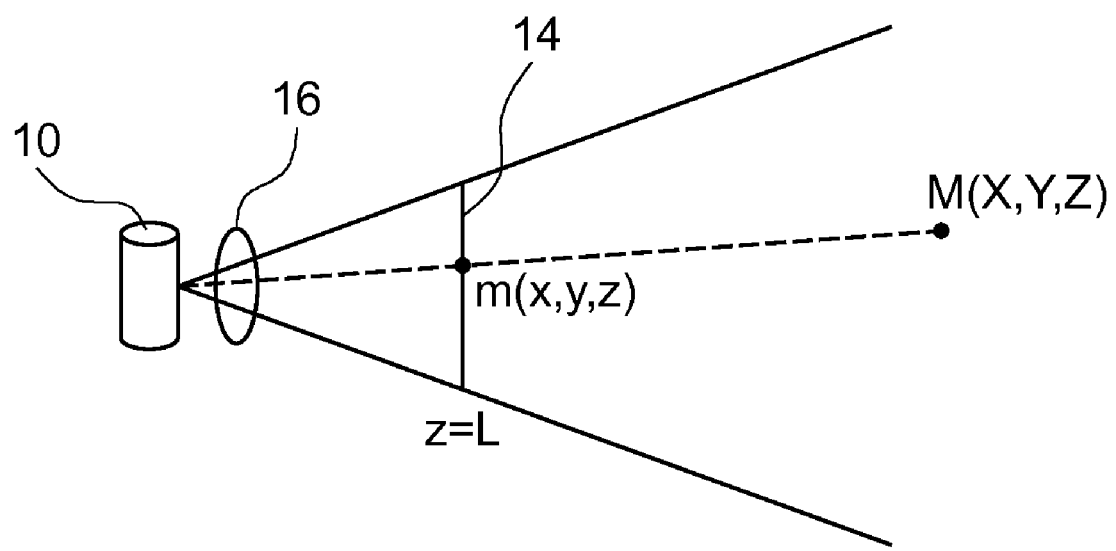
FIG. 1 is a schematic view of a photosensing system used in the prevent invention.

Referring to FIG. 1, a schematic view of a photosensing system used in the prevent invention is illustrated. The photosensing system of FIG. 1 includes a photosensing device 10, an optical lens assembly 16 and a focal plane 14. As shown in FIG. 1, a point M (X, Y, Z) having coordinates according to the three dimensional coordinate system is imaged onto the focal plane 14 as a light spot m (x, y, z). Assuming the distance of the light spot m relative to the photosensing device 10 is L, the coordinates of the light spot m (x, y, z) may be rewritten as m (X×L/Z, Y×L/Z, L). As previously described, image distortion is possibly encountered in the lens of the optical lens assembly 16. Since the image distortion is symmetric with respect to the central point, the central point of the optical lens assembly 16 relative to the photosensing device 10 should be obtained. For correcting the image distortion, the three dimensional coordinate system is preferably converted into a polar coordinate system by the following equations 1~4:

$$m = A[RT]M \quad \text{(Equation 1)}$$

$$A = \begin{bmatrix} f_x & 0 & c_x \\ 0 & f_y & c_y \\ 0 & 0 & 1 \end{bmatrix} \quad \text{(Equation 2)}$$

$$R = \begin{bmatrix} r_{11} & r_{12} & r_{13} \\ r_{21} & r_{22} & r_{23} \\ r_{31} & r_{32} & r_{33} \end{bmatrix}, \; T = \begin{bmatrix} t_1 \\ t_2 \\ t_3 \end{bmatrix} \quad \text{(Equation 3)}$$

$$\hat{x} = x + x[k_1 r^2 + k_2 r^4] + [2p_1 xy + p_2(r^2 + 2x^2)] \quad \text{(Equation 4)}$$

$$\hat{y} = y + y[k_1 r^2 + k_2 r^4] + [2p_2 xy + p_2(r^2 + 2y^2)]$$

$$r^2 = x^2 + y^2$$

where the matrix A is a rectangular table consisting of quantities of the photosensing device 10 and the optical lens assembly 16, $f_x$ and $f_y$ are respectively focal lengths along the x-axis and y-axis, cx and cy are respectively x-coordinate and y-coordinate of the central point of the optical lens assembly 16 imaged onto the photosensing device 10, x and y are respectively x-coordinate and y-coordinate of the central point (cx, cy). The matrices R and T are transformation matrices of angular coordinates and radial coordinates, respectively. The terms k1, k2, p1 and p2 indicate a second-order radial distortion amount, a fourth-order radial distortion amount, a second-order tangential distortion amount and a fourth-order tangential distortion amount, respectively.

Figure 2:
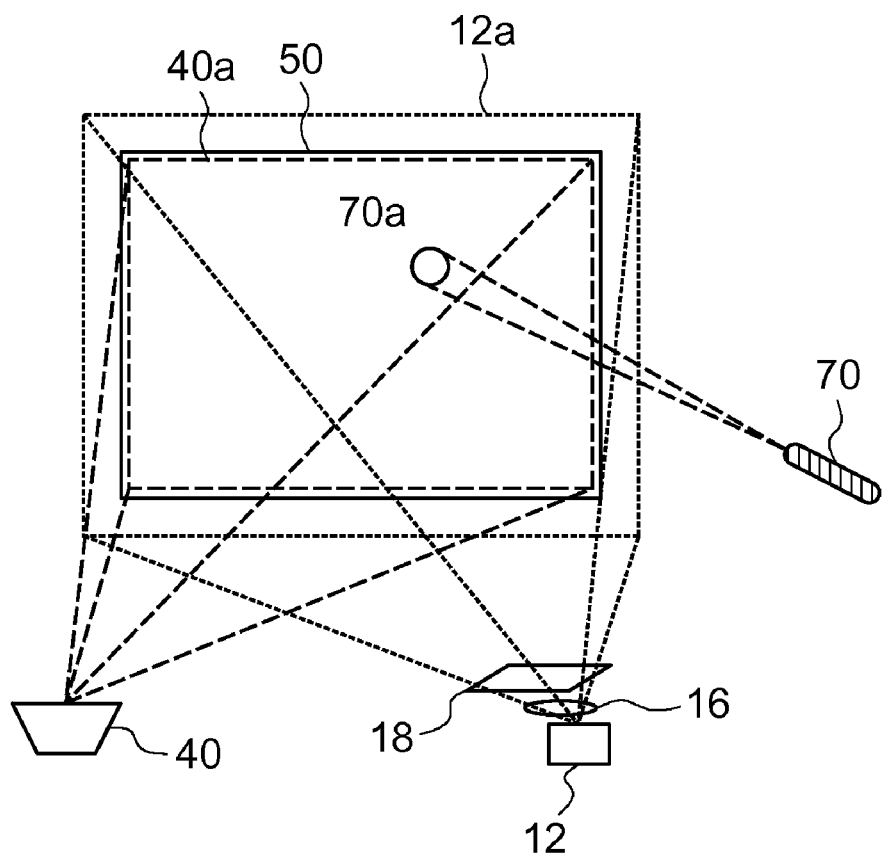
FIG. 2 is a schematic view of a pointer input system according to the present invention.
Figure 2:
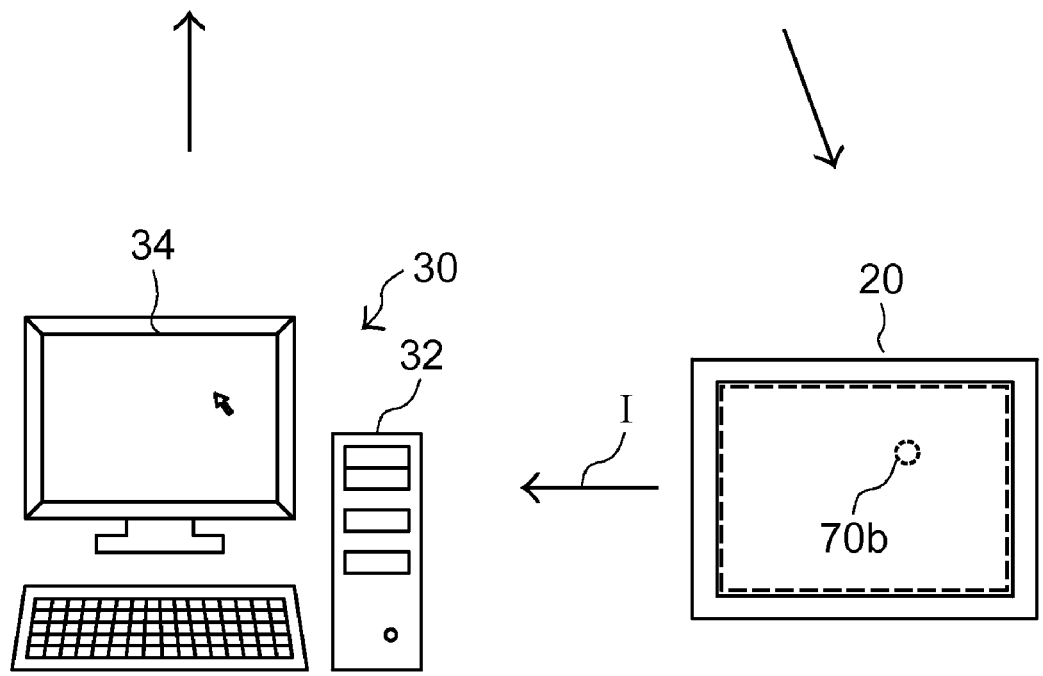

Referring to FIG. 2, a schematic view of a pointer input system according to the present invention is illustrated. The pointer input system of FIG. 2 principally includes a data processing system 30, an image projecting system 40 (e.g. a projector), a projection screen 50 and a photosensing system 12. The data processing system 30 includes a monitor 34 and a processor 32. As also shown in FIG. 2, an optical lens assembly 16 is disposed in front of the photosensing system 12, so that the projection screen 50 may be imaged onto the photosensing system 12. In addition, a dual-band filter or a multi-band filter 18 is disposed in front of the optical lens assembly 16 for filtering off the polarized light from the image projecting system 40 or the surroundings, so that the recognizing effect is enhanced. Moreover, a first rim 40a defines the input field of the image projecting system 40, and a second rim 12a defines the captured range of the photosensing system 12.

Hereinafter, an input method of the pointer input system will be illustrated as follows with reference to FIG. 2.

First of all, a system image shown on the monitor 34 of the data processing system 30 is projected onto the projection screen 50. Then, a light spot 70a issued from a pointer generating device 70 is also projected onto the projection screen 50. Then, the photosensing system 12 captures the image of the projection screen 50, thereby generating a light-spot image 20. The light-spot image 20 is transmitted to the processor 32 of the data processing system 30 and processed by the processor 32 into an input data I of the data processing system 30. As shown in FIG. 2, the light spot 70a projected onto the projection screen 50 corresponds to the light spot 70b shown on the light-spot image 20.

For processing the captured image 20 into the input data I of the data processing system 30, a correcting procedure is necessary. In addition, for recognizing corresponding light spots shown on the light-spot image 20, a setting procedure should be done. The detailed processes of performing the calibrating operation and the setting procedure will be illustrated as follows.

Figure 3:
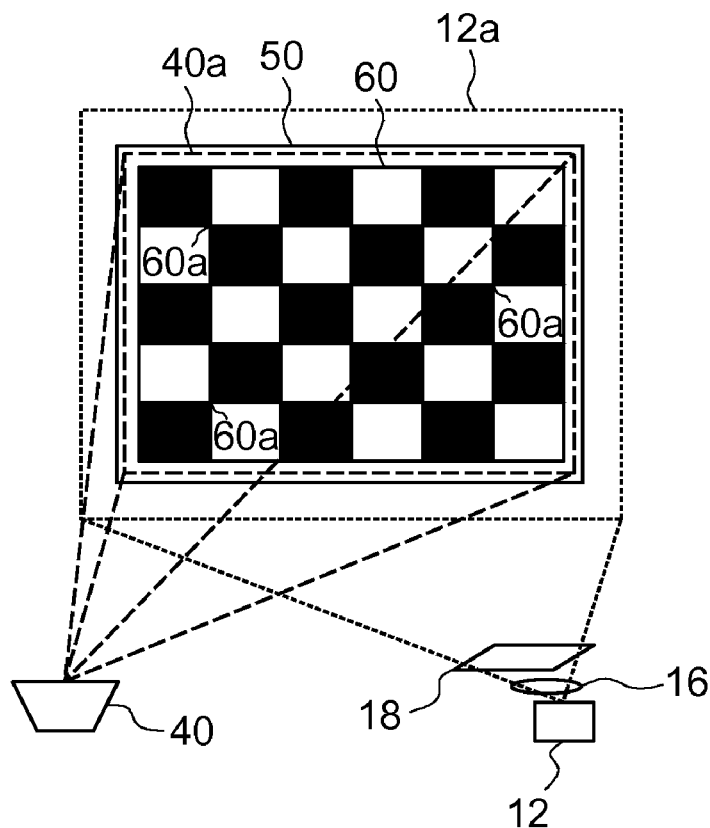
FIG. 3 is a schematic view illustrating a process of performing the correcting procedure according to an embodiment of the present invention.
Figure 3:
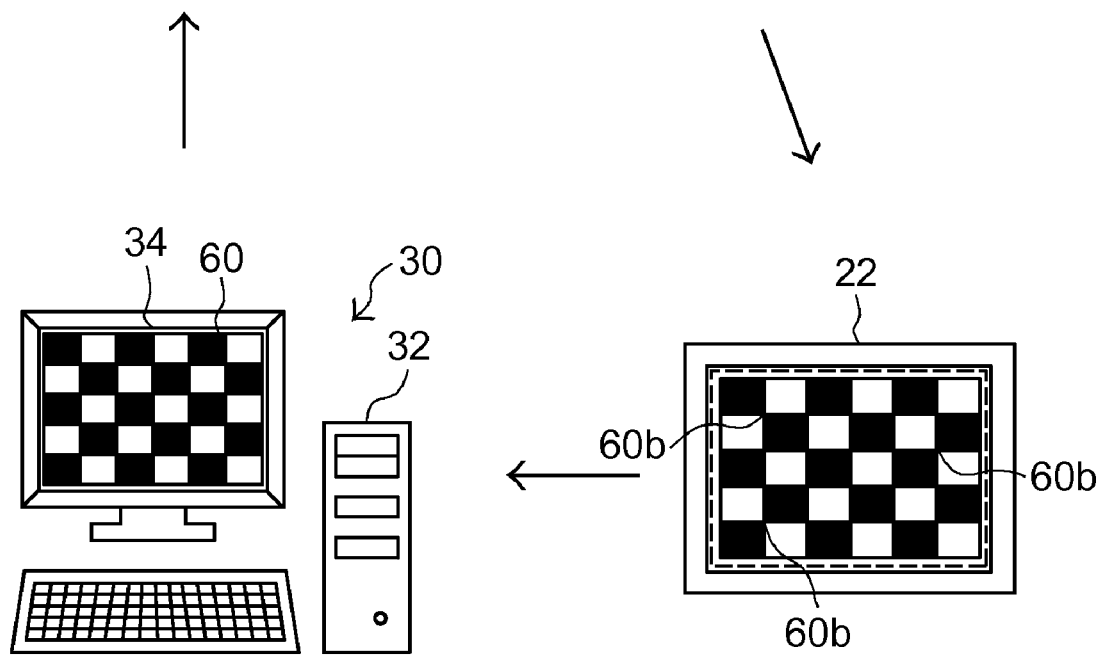

Referring to FIG. 3, a process of performing the correcting procedure according to an embodiment of the present invention is schematically illustrated. First of all, a reference frame 60 shown on the monitor 34 of the data processing system 30 is projected onto the projection screen 50. Then, the photosensing system 12 captures the image of the projection screen 50, thereby generating a reference image 22. The reference frame 60 includes a plurality of reference points 60a. By means of image recognition software, the reference points 60b of the reference image 22 corresponding to the reference points 60a of the reference frame 60 are recognized. By means of associated software for calculating the relative space displacement and the amount of rotation, the reference points are compared with predetermined reference data so as to obtain a space rotation and displacement parameter. The space rotation and displacement parameters mean the mutual space conversion relationship between the projection screen 50 and the photosensing system 12. Next, several reference points according to the three dimensional coordinate system are compared and a distortion parameter is obtained by using a lens' distortion equation, e.g. the above-described equation 4. The mutual space conversion relationship between the projection screen 50 and the photosensing system 12 is compensated by the distortion parameter, thereby obtaining a more precise space conversion relationship C.

Figure 4:
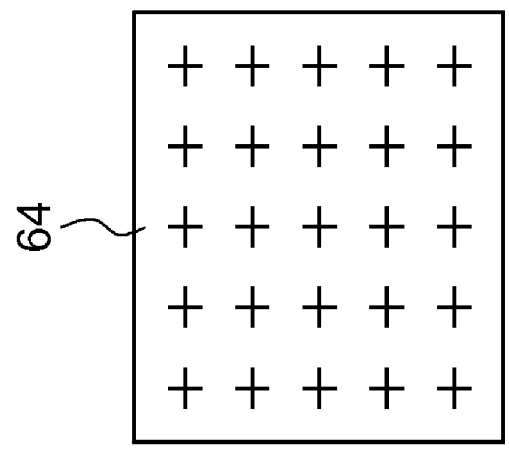
FIG. 4 schematically illustrates three examples of the reference images.
Figure 4:
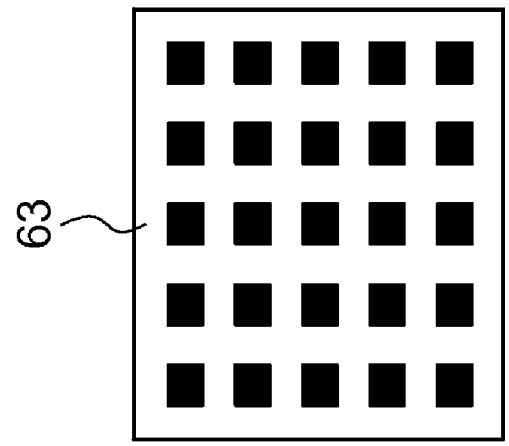
Figure 4:
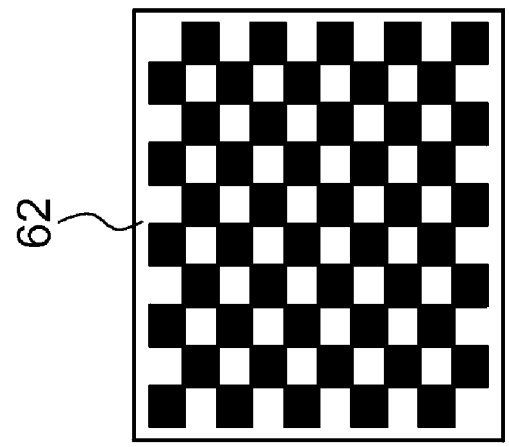

Furthermore, the number of the pixels constituting the reference frame 60 shown on the monitor 34 of the data processing system 30 may be manually or automatically detected. The reference frame 60 may have an arbitrary pattern. In FIG. 4, three examples of the reference images 60 are schematically illustrated. In the first example, the reference frame 60 has a checkerboard pattern 62. In the second example, plural block-shaped dots are discretely arranged at regular intervals to form a block dot pattern 63. In the third example, plural cross-shaped dots are discretely arranged at regular intervals to form a cross dot pattern 64.

Figure 5:
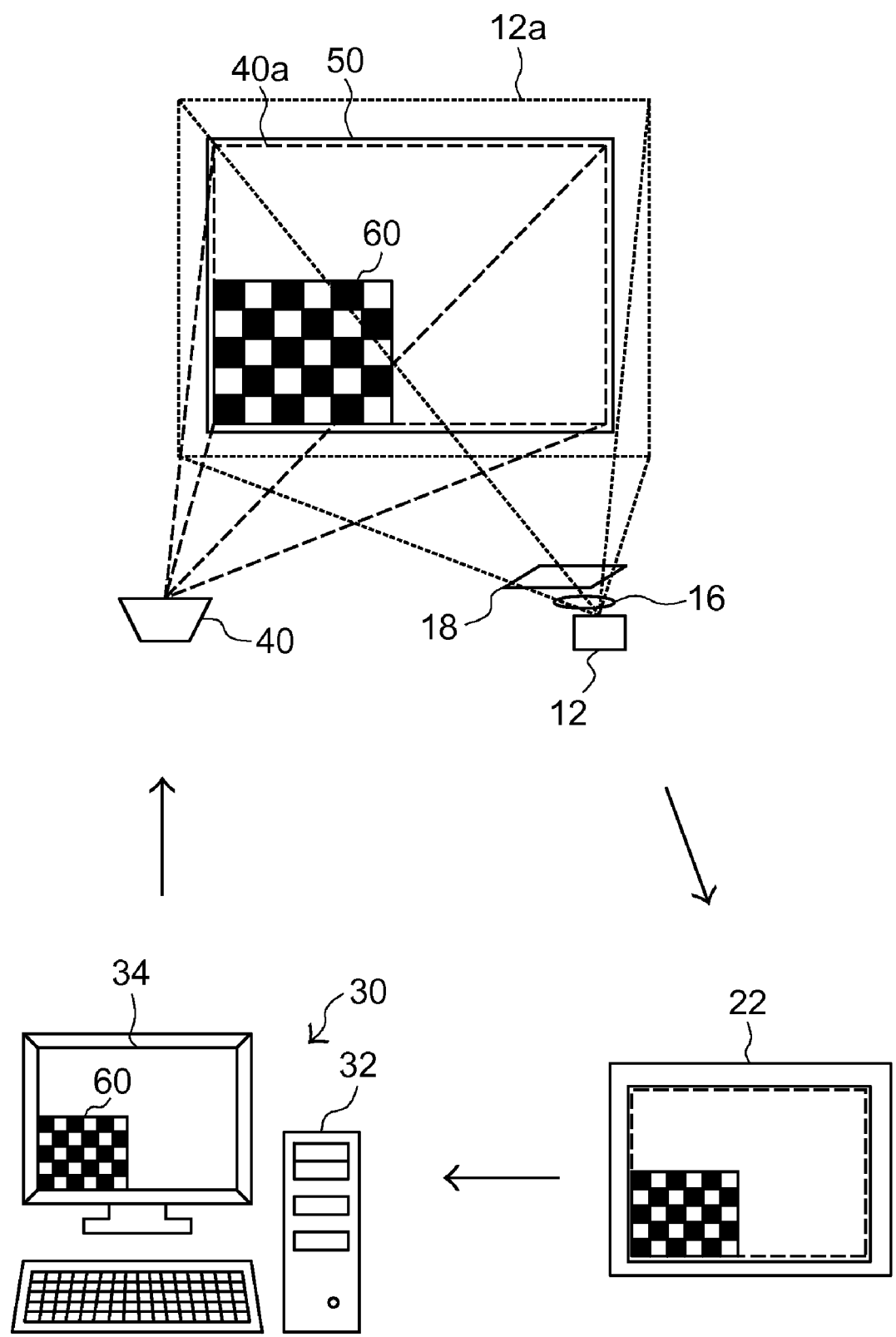
FIG. 5 schematically illustrates that the reference frame is scaled down and arranged on the lower left corner of the projection screen.

In an embodiment, as shown in FIG. 5, the size and the location of the reference frame 60 to be shown on the projection screen 50 are adjusted as required. For example, the reference frame 60 is scaled down and arranged on the lower left corner of the projection screen 50.

Figure 6:
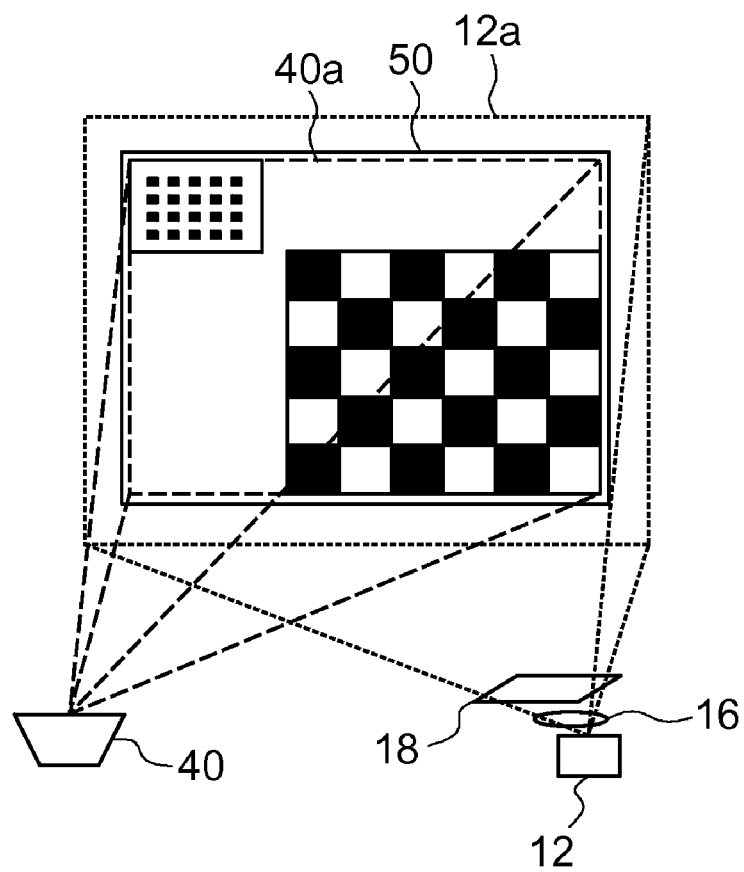
FIG. 6 schematically illustrates that the recognized reference points are directly shown on the projection screen.
Figure 6:
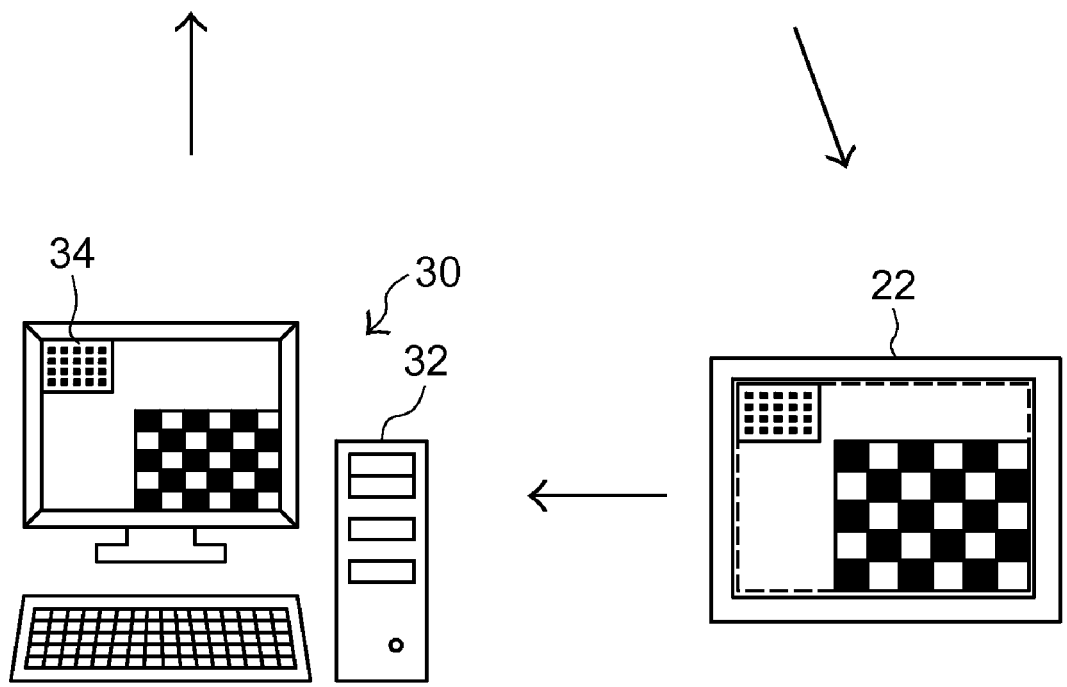

In an embodiment, as shown in FIG. 6, the recognized reference points may be directly shown on the projection screen 50. According to the recognized reference points and the reference image, the user may adjust the direction of the photosensing system 12 so as to achieve a better correcting performance.

Figure 7:
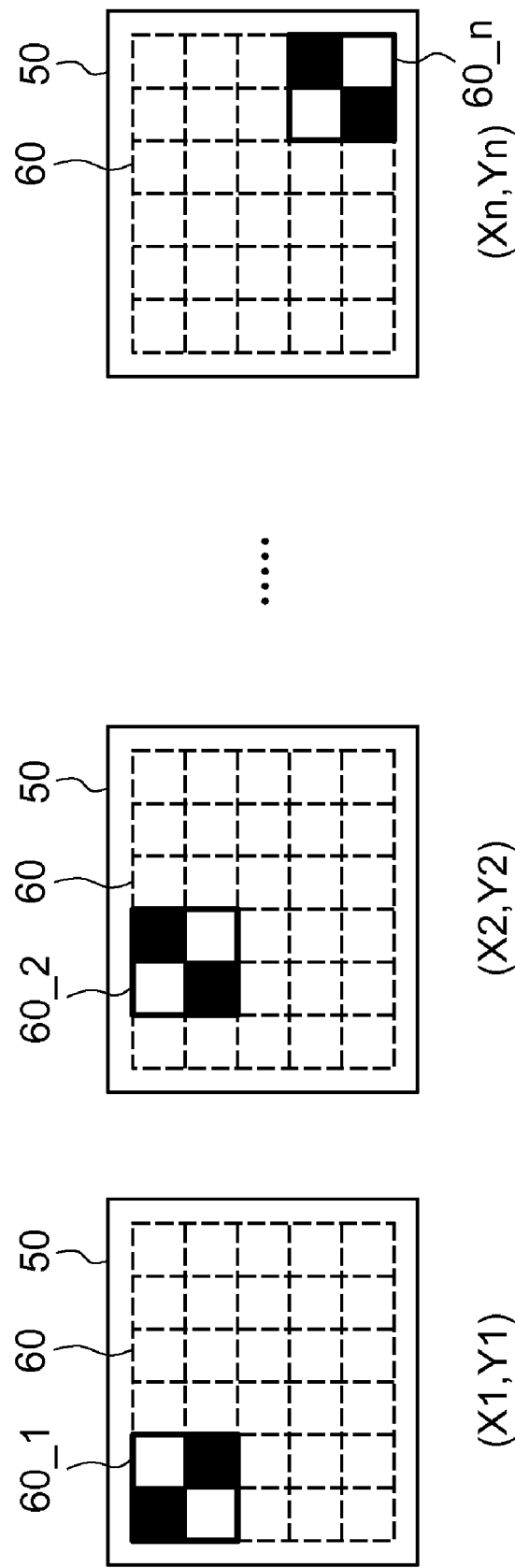
FIG. 7 schematically illustrates the coordinate values of multiple sub-frames of the reference frame.

In an embodiment, a plurality of reference images are projected onto the projection screen 50 in order to increase the number of reference points and achieve a better correcting performance. As shown in FIG. 7, the reference frame 60 may be divided into n counts of sub-frames 60_1, 60_2, ..., and 60_n. These sub-frames are successively projected onto the projection screen 50 and captured by the photosensing system 12. Then, the recognized reference points are compared with predetermined reference data. By using the above-described mathematic algorithm, the space conversion relationship C is obtained.

Figure 8:
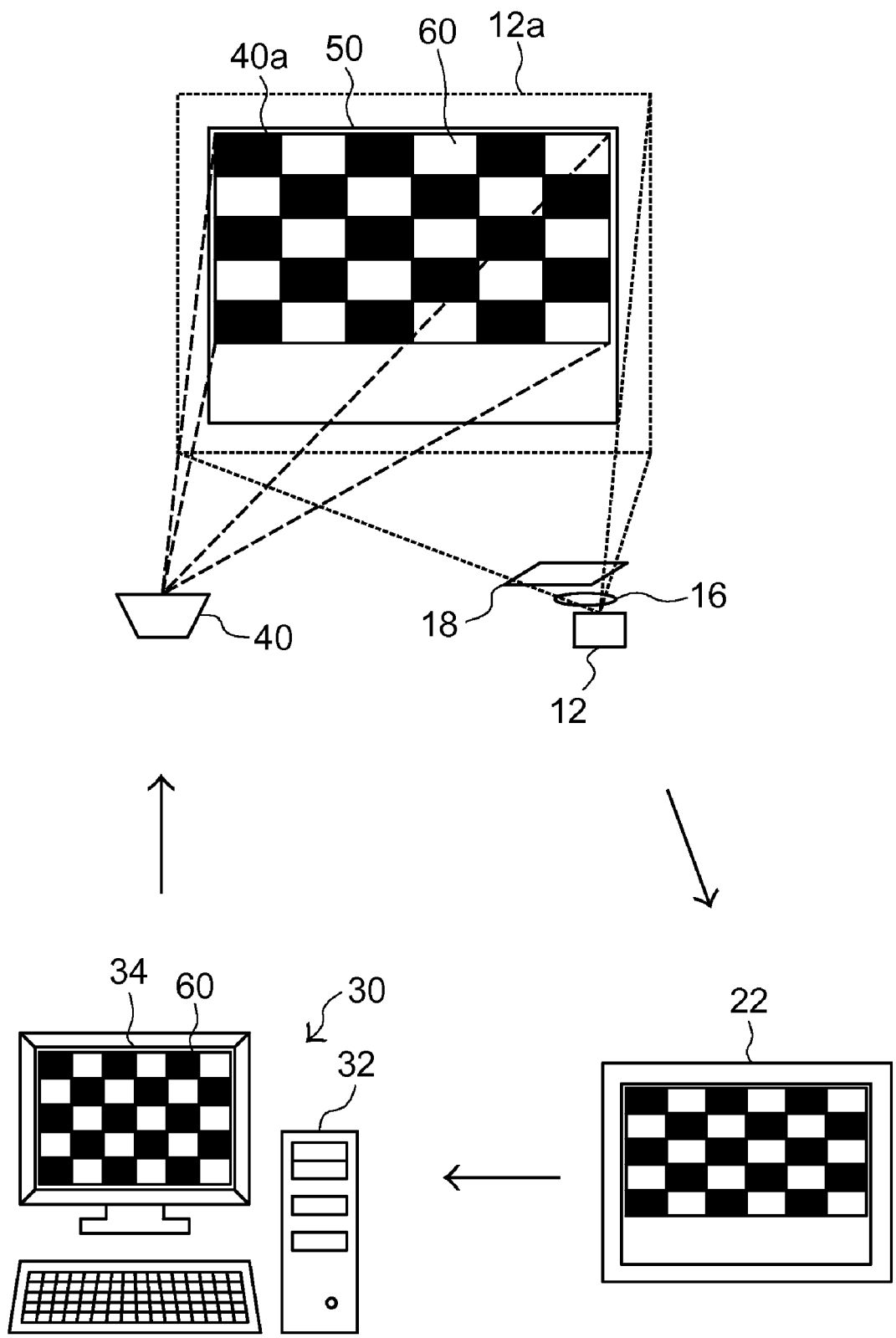
FIG. 8 schematically illustrates that the aspect ratio of the reference frame shown on the projection screen is increased due to undesirable settings of the image projecting system.

In a case that the settings of the image projecting system 40 is undesirable or the projection screen 50 is twisted, the space conversion relationship C is not satisfied. For example, as shown in FIG. 8, the aspect ratio of the reference frame 60 shown on the projection screen 50 is increased when compared with the system frame shown on the monitor 34 because the settings of the image projecting system 40 is undesirable settings of the image projecting system 40 is undesirable. Meanwhile, the recognized reference points and the reference data are converted into the same coordinate system, thereby discriminating whether the space conversion relationship C is satisfied and the correcting procedure is successful.

Figure 9:
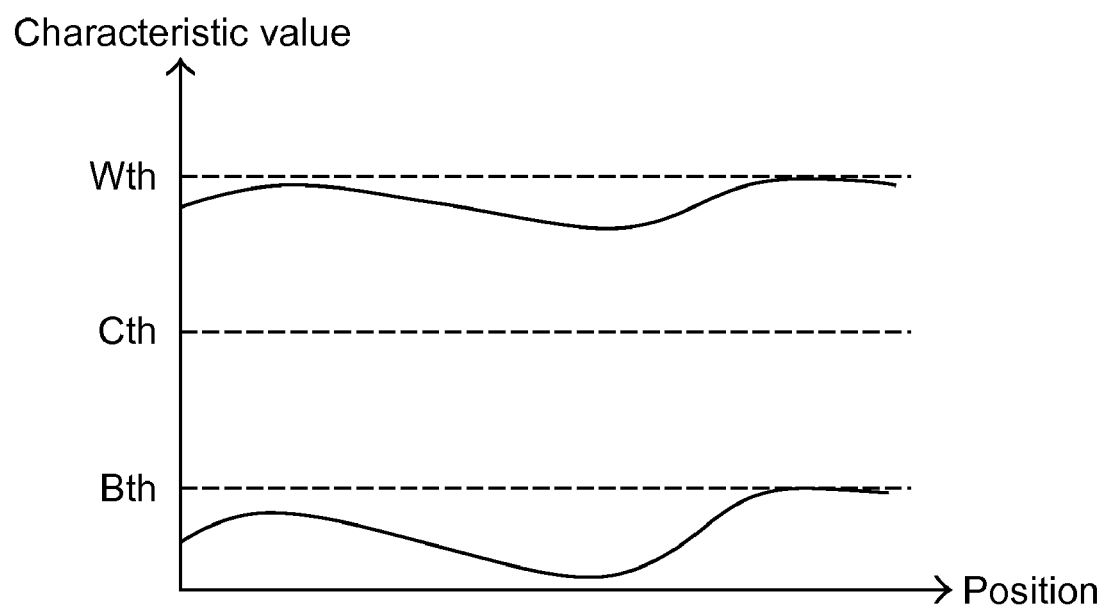
FIG. 9 is a schematic plot illustrating a critical value obtained according to a reference white value and a reference black value.

Please refer to FIG. 3 again. The reference frame 60 of FIG. 3 is a two-color image. For recognizing the reference points 60b of the reference image 22, the black color portion and the white color portion of the reference image 22 should be determined. First of all, a full white frame is projected onto the projection screen 50 and captured by the photosensing system 12. The color information about this full white frame is measured, thereby obtaining a reference white value Wth. Likewise, a full black frame is projected onto the projection screen 50 and captured by the photosensing system 12. The color information about this full black frame is measured, thereby obtaining a reference black value Bth. The reference white value Wth and the reference black value Bth are averaged to obtain a black-and-white critical value Cth. The reference white value Wth, the reference black value Bth and the black-and-white critical value Cth are plotted in FIG. 9. In some embodiments, the color information is also referred as a characteristic value. The characteristic value includes but is not limited to color intensity, brightness or gray scale. In an embodiment, a first portion of the reference image 22 of FIG. 3 having the characteristic value greater than the black-and-white critical value Cth is considered as the white color portion. Whereas, a second portion of the reference image 22 of FIG. 3 having the characteristic value smaller than the black-and-white critical value Cth is considered as the black color portion.

Figure 10:
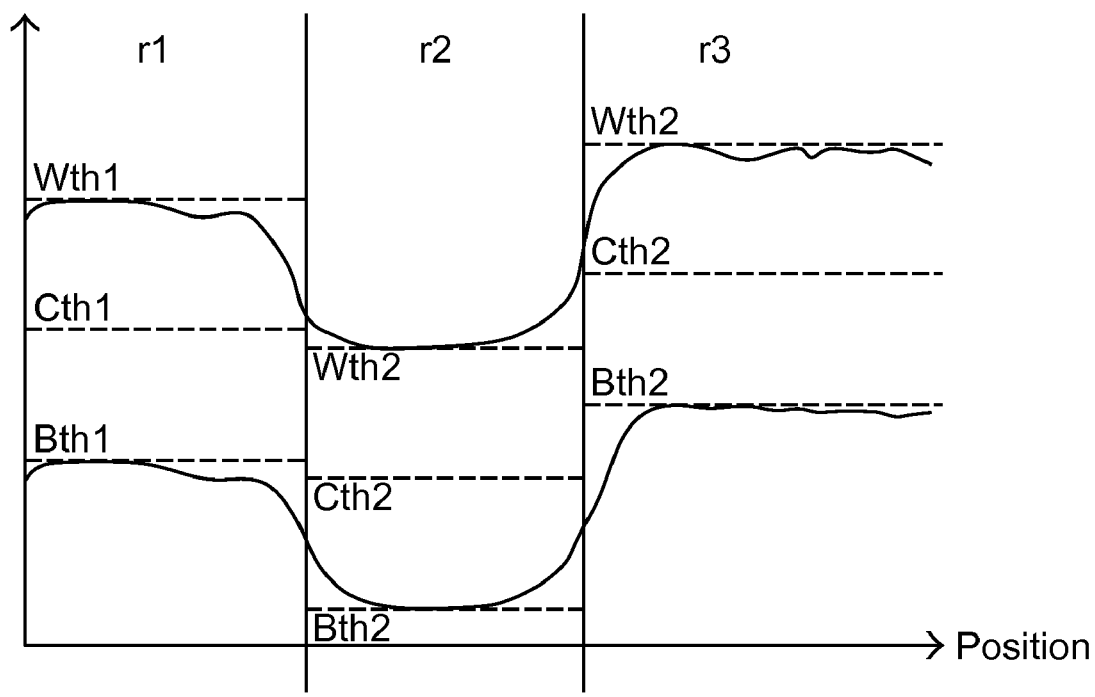
FIG. 10 is a schematic plot illustrating critical values of respective regions and obtained according to the reference white values and the reference black values of respective regions.

Due to some factors such as background light, lens variation and/or unevenness of the photosensing device, the brightness of the captured image is usually not uniformly distributed. For obtaining a more accurate black-and-white critical value Cth, the reference image may be divided into several regions and these regions have respective black-and-white critical values Cth. For example, as shown in FIG. 10, the reference image is divided into three regions r1, r2 and r3. Three reference white values Wth1, Wth2 and Wth3 are measured for the regions r1, r2 and r3, respectively. Three reference black values Bth1, Bth2 and Bth3 are also measured for the regions r1, r2 and r3, respectively. As consequence, three black-and-white critical values Cth1, Cth2 and Cth3 are calculated for the regions r1, r2 and r3, respectively. Moreover, in order to obtain more accurate black-and-white critical values Cth1, Cth2 and Cth3, the reference white values of plural full white frames and the reference black values of plural black white frames for respective regions are averaged. In this embodiment, each of the regions r1, r2 and r3 includes one or more pixels.

Figure 11:
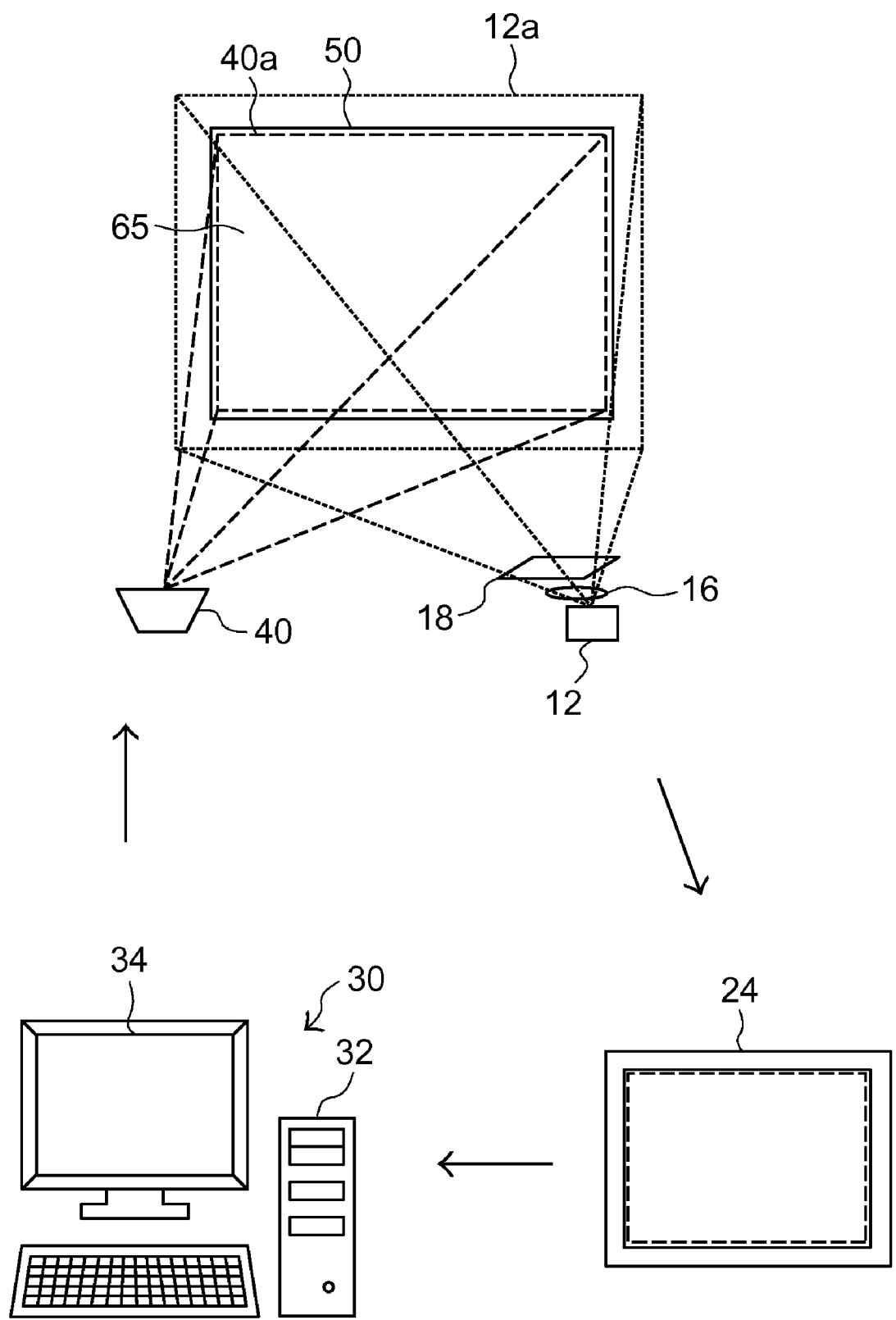
FIG. 11 is a schematic view illustrating a process of performing the setting procedure according to an embodiment of the present invention.
Figure 12:
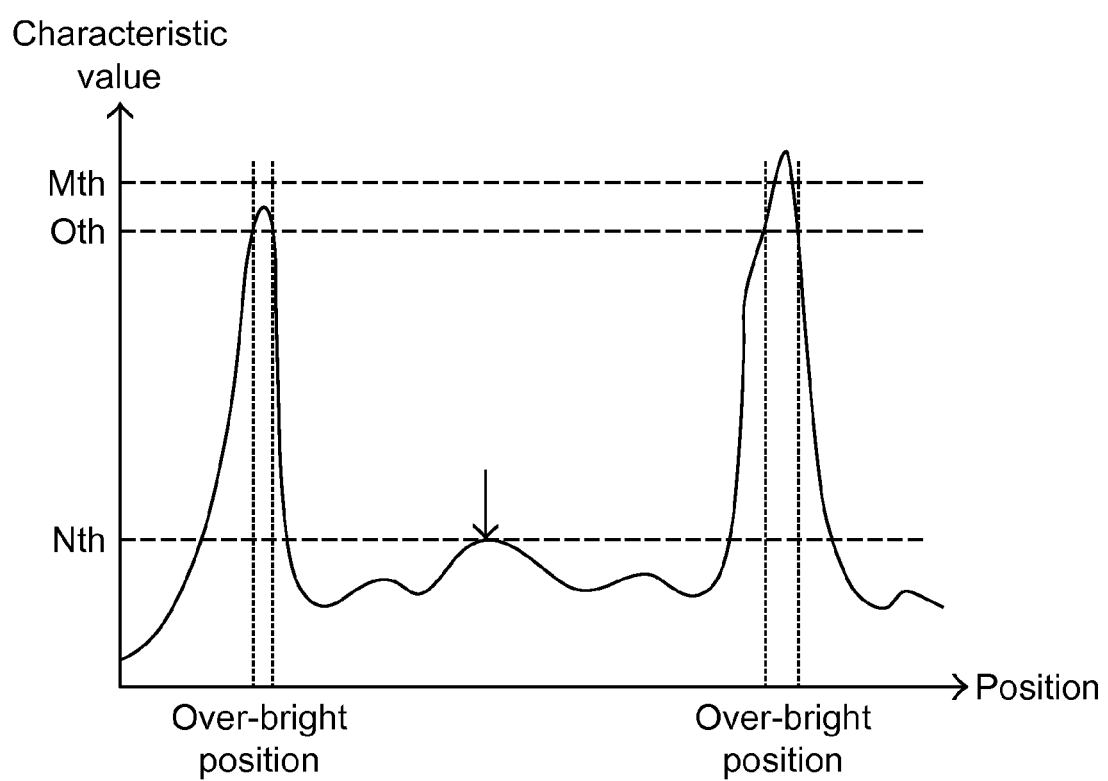
FIG. 12 is a schematic plot illustrating characteristic values of the reference image and the over-bright positions.
Figure 13:
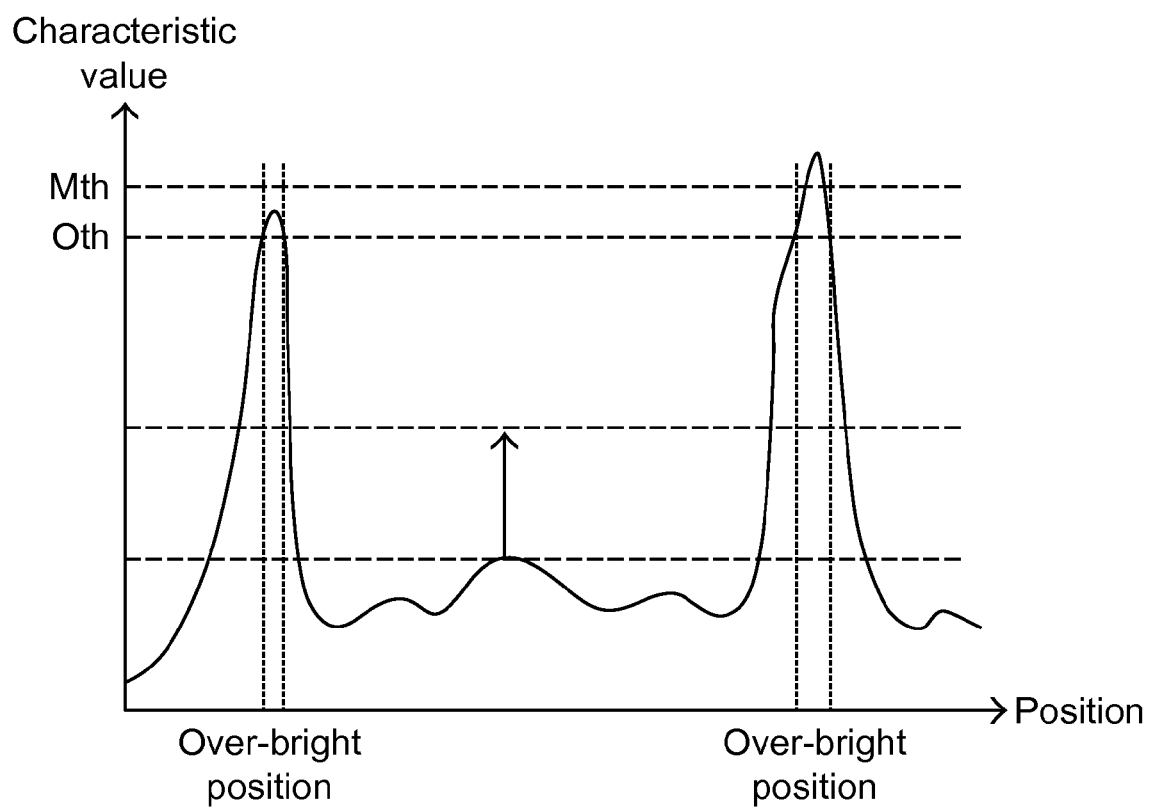
FIG. 13 is a schematic plot illustrating characteristic values of the reference image for defining a light-spot threshold value by excluding the characteristic values of the over-bright positions.
Figure 14:
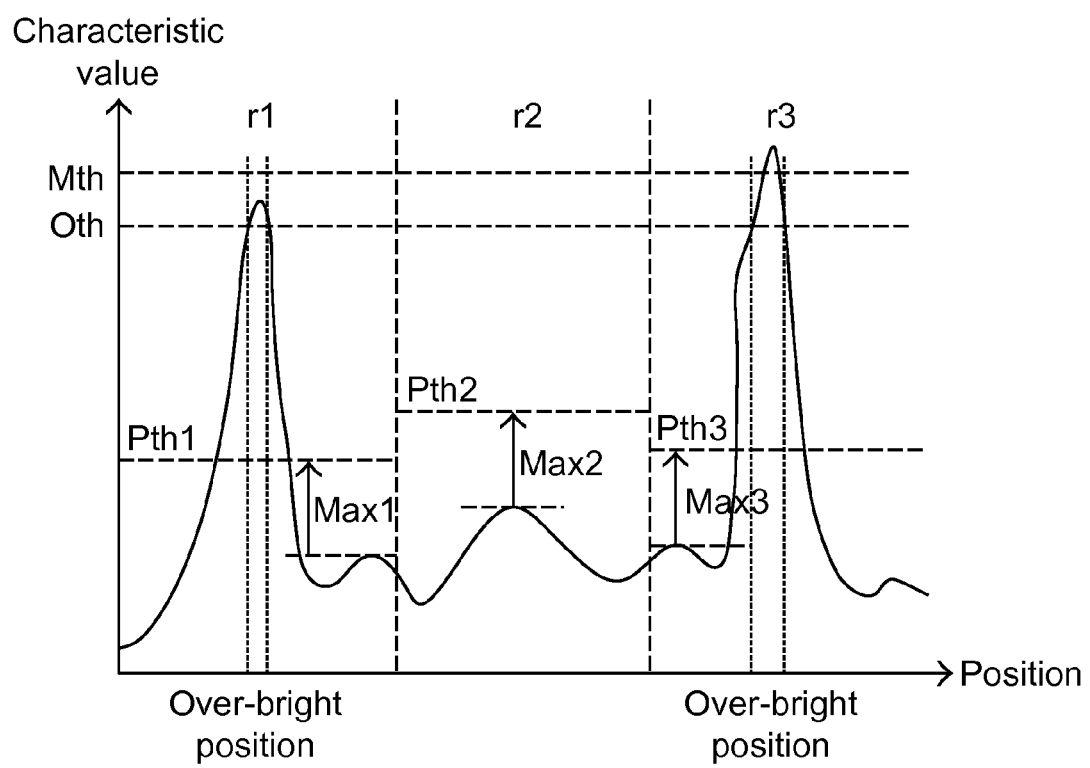
FIG. 14 is a schematic plot illustrating characteristic values of respective regions for defining light-spot threshold values of respective regions by excluding the characteristic values of the over-bright positions.

Referring to FIG. 11, a process of performing the setting procedure according to an embodiment of the present invention is schematically illustrated. First of all, a frame 65 of white or other color is projected onto the projection screen 50 and captured by the photosensing system 12, thereby generating a reference image 24. The reference image 24 is transmitted to the processor 32 and the color information of the reference image 24 is analyzed by the processor 32. The color information (i.e. characteristic value) includes but is not limited to color intensity, brightness or gray scale. A characteristic value of the reference image 24 is plotted in FIG. 12. In this context, the portion of the reference image 24 having a characteristic value greater than an over-bright threshold value Oth is referred as an over-bright position S. The term Mth of FIG. 12 indicates a maximum gray scale (=255). By adjusting the signal-to-noise ratio of the photosensing system 12, the reference image 24 excluding the over-bright position S has a peak value Max smaller than a noise threshold value Nth. Next, as shown in FIG. 13, the noise threshold value Nth is added by a certain value to a light-spot threshold value Pth. In this embodiment, the light-spot threshold value Pth is used as a measure of discriminating the characteristic situation of the light spot. For obtaining a more accurate light-spot threshold value Pth, the reference image may be divided into several regions and these regions have respective light-spot threshold values Pth. For example, as shown in FIG. 14, the reference image 24 is divided into three regions r1, r2 and r3. The reference image 24 excluding the over-bright position S has three peak values Max1, Max2 and Max3 for the regions r1, r2 and r3, respectively. These peak values Max1, Max2 and Max3 are added by a certain value to light-spot threshold values Pth1, Pth2 and Pth3 for the regions r1, r2 and r3, respectively. In this embodiment, each of the regions r1, r2 and r3 includes one or more pixels. After the above correcting procedure and setting procedure, the space conversion relationship C, the over-bright position S and the light-spot threshold value Pth have been obtained.

Figure 15:
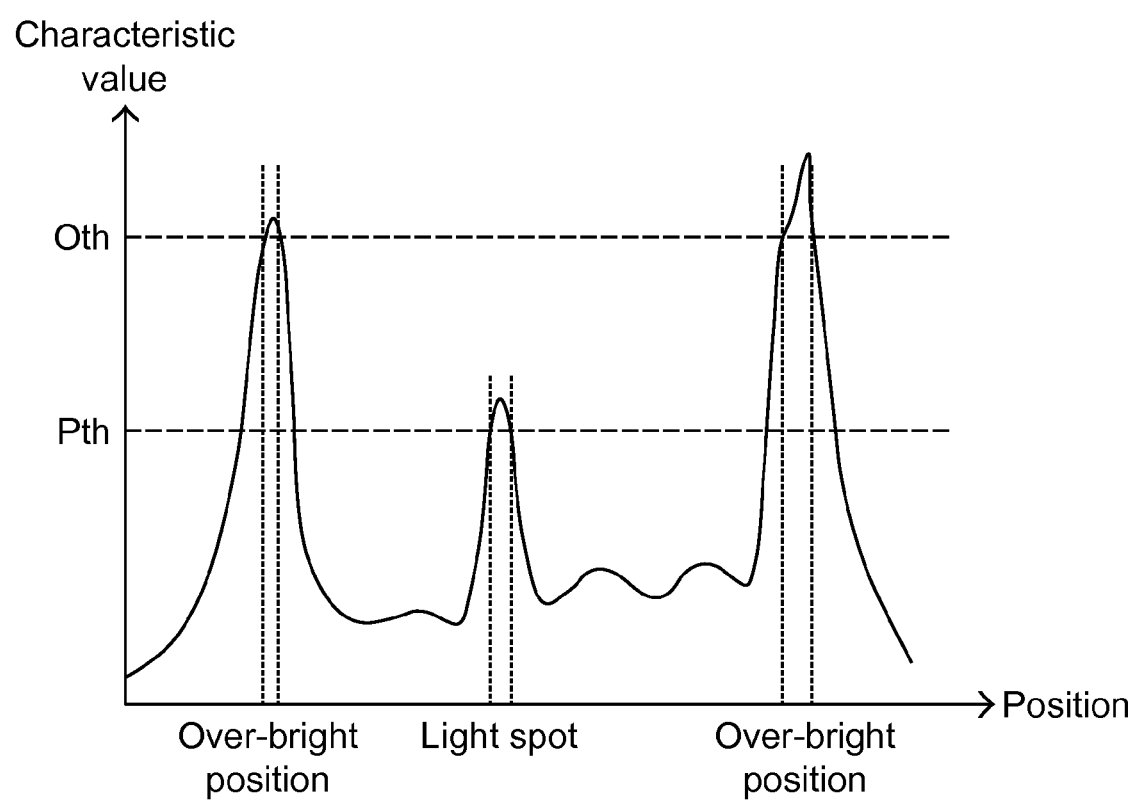
FIG. 15 is a schematic plot illustrating characteristic values of recognized light spots of the light-spot image by excluding the characteristic values of the over-bright positions.
Figures 16, 17:
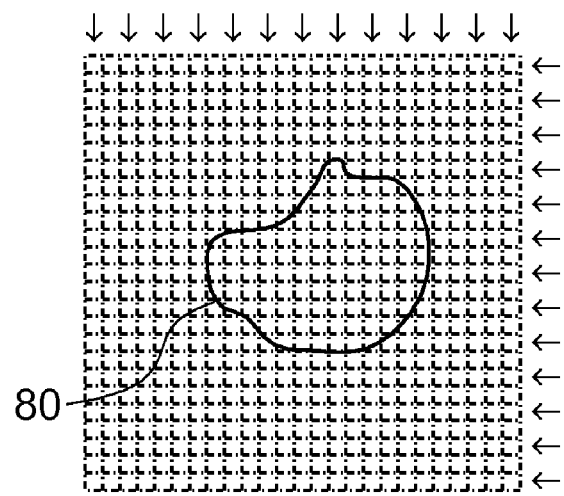
FIG. 16 is a schematic view illustrating an image block composed of the pixels complying with the characteristic situation of the light spot and the adjacent pixels, in which the pixels are scanned in alternate rows or in alternate columns.
FIG. 17 is a schematic view illustrating a method of recognizing the light-spot position.

Please refer to FIG. 2 again. A light spot 70a issued from a pointer generating device 70 is projected onto the projection screen 50. Then, the photosensing system 12 captures the image of the projection screen 50, thereby generating a light-spot image 20. The light-spot image 20 is transmitted to the processor 32 of the data processing system 30 and processed by the processor 32, thereby recognizing corresponding light spot 70b shown on the light-spot image 20. A characteristic value of the light-spot image 20 is plotted in FIG. 15. Referring to FIG. 2 and FIG. 15, the light spot of the light-spot image 20 has a characteristic value greater than the light-spot threshold value Pth when the over-bright position S is excluded. The pixels complying with the characteristic situation of the light spot and the adjacent pixels are incorporated in a same image block 80, as is shown in FIG. 16. Some information including for example the average brightness value, hue value, length, width or area of the image block 80 is calculated. In this embodiment, the area of the image block 80 is ranged between a first reference area value and a second reference area value. If the area of the image block 80 is smaller than the first reference area value or larger than the second reference area value, the image block 80 is deemed as a non-light spot. On the other hand, if an image block is deem as a light spot, the position of the light spot will be determined according to a characteristic value of the image block. As shown in FIG. 17, the image block 80 is constituted by several pixels. The characteristic values (e.g. 256 gray scales) for respective pixels are measured. The center of mass of the image block 80 is substantially the position of the light spot. For achieving a more accurate light-spot position, these pixels have at least three different levels of the characteristic values to determine the center of mass of the image block 80. After the above analyses, a light-spot data is obtained. According to the space conversion relationship, the light-spot data is converted into the input data I of the data processing system 30. For example, the light-spot data includes a light-spot position data.

In an embodiment, the light-spot data is stored in the data processing system 30. When the light spot 70a as shown in FIG. 2 is moved on the projection screen 50, the photosensing system 12 continuously captures the image of the projection screen 50. According to the light-spot data stored in the data processing system 30, continuous moving actions and relative positions of the continuously captured light spots 70b are monitored and tracked.

In an embodiment, multiple light spots 70a are projected onto the projection screen 50 by using the pointer generating device 70. As a consequence, the purpose of implementing multi-input or opinion exchange will be achieved. In this embodiment, the procedures of recognizing the light spots are identical to those described above, and are not redundantly described herein.

Since it takes a processing time period from the recognition of the light spots to conversion of the light-spot data (into the input data I), there is often a time delay between the input frame and the input pointer. In accordance with the present invention, the following five approaches are used to reduce influence of the time delay.

Figure 18:
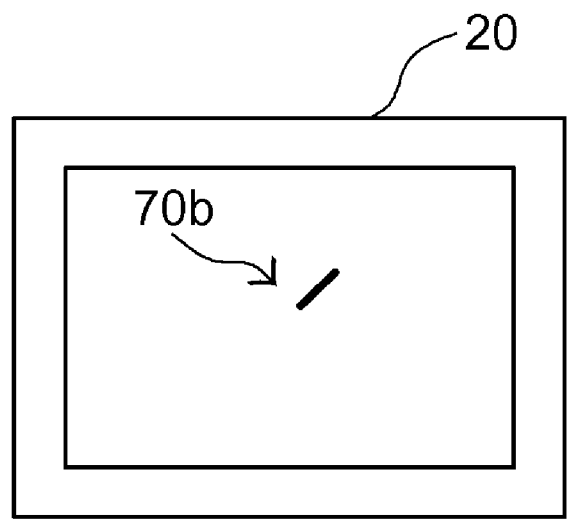
FIG. 18 is a schematic view illustrating a linear light spot captured by the photosensing system due to the exposure time of the photosensing system.
Figure 19:
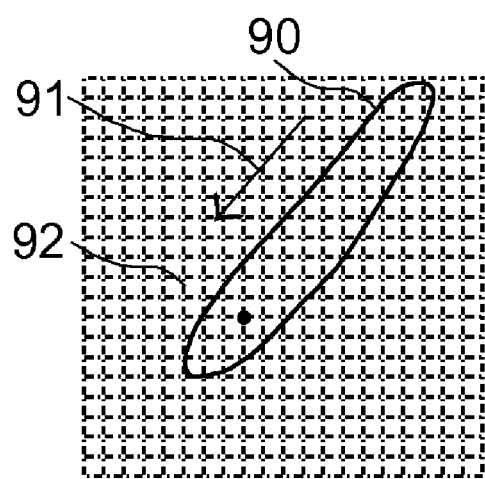
FIG. 19 is a schematic view illustrating the terminal portion of the image block along the light-spot direction, which is determined according to the previously stored light-spot data.

As for the first approach of reducing influence of the time delay, please refer to FIG. 2 again. In a case that the light spot 70a is moved on the projection screen 50 and captured by the photosensing system 12, a corresponding linear light spot 70b is shown on the light-spot image 20, as can be seen in FIG. 18. The occurrence of the linear light spot 70b is mainly resulted from the response time or the exposure time of the photosensing system 12. Likewise, as described above, the pixels complying with the characteristic situation of the light spot and the adjacent pixels may be incorporated in a same image block 90, as is shown in FIG. 19. According to the light-spot data previously stored in the in the data processing system 30, the moving direction of the light spot, which is indicated by the arrow 91, is determined. According to the moving direction 91 of the light spot, a terminal portion 92 of the image block 90 is defined. For example, one third of the image block 90 at the rear along the moving direction 91 may be defined as the terminal portion 92. Also, the terminal portion 92 of the image block 90 is constituted by several pixels. According to the color information of the terminal portion 92, for example the characteristic values of respective pixels, the center of mass of the terminal portion 92 is substantially the light-spot position.

Figure 20:
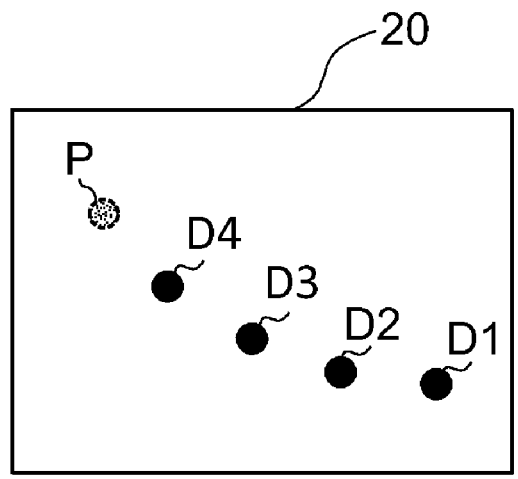
FIG. 20 is a schematic view illustrating an anticipated light spot constructed from known light spots by extrapolation algorithm.
Figure 21:
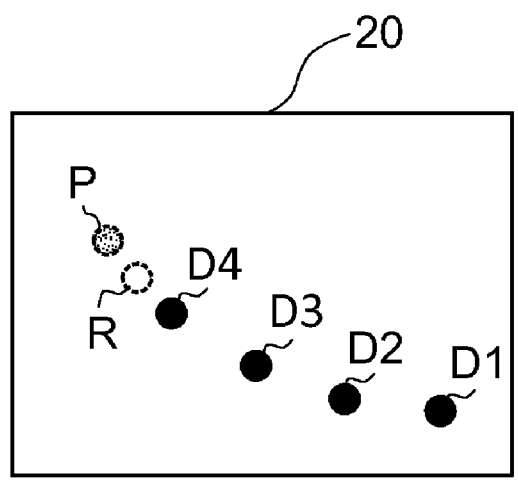
FIG. 21 is a schematic view illustrating a compensated light spot constructed from known light spots by interpolation algorithm.

As for the second approach, please refer to FIG. 20. As shown in FIG. 20, several light spots D1, D2, D3 and D4 on the light-spot image 20 are successively recognized. The light-spot data of the D1, D2, D3 and D4 are stored into the data processing system 30. By extrapolation algorithm, at least a new light spot P beyond a set of known light spots D1, D2, D3 and D4 will be anticipated. Although the extrapolation algorithm may be subject to uncertainty, it is noted that the anticipated light spot P is closer to the actual input pointer when compared with the previous light spots D1, D2, D3 and D4. Moreover, as shown in FIG. 21, at least a compensated light spot R is obtained from the known light spots D1, D2, D3, D4 and P by interpolation algorithm so as to enrich the input data I and have the image frames look smoother.

Figure 22:
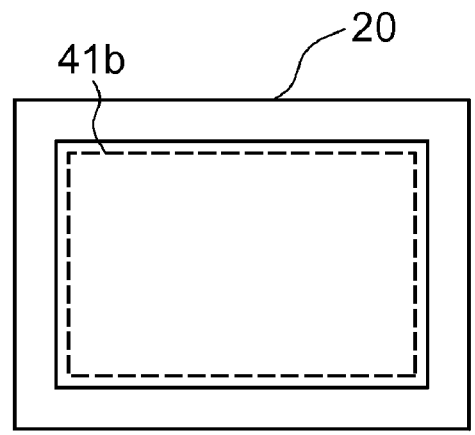
FIG. 22 is a schematic view illustrating a region of interest of the light-spot image.

For enhancing the processing speed, it is preferred that only a region of interest of the light-spot image 20 is analyzed. The region of interest of the light-spot image 20 the may be deduced according to the space conversion relationship C. In accordance with the third approach, as shown in FIG. 22, the region of interest corresponds to the input field 41b of the image projecting system 40.

As shown in FIG. 16, the light-spot image 20 is composed of several tens or hundreds of pixels. As a consequence, even if the pixels are analyzed in alternate rows or in alternate columns, the light spot may be still successfully recognized in accordance with the fourth approach of reducing influence of the time delay.

In accordance with a fifth approach, the size of the light-spot image 20 is shrunk when compared with the reference image obtained in the correcting procedure.

Figure 23:
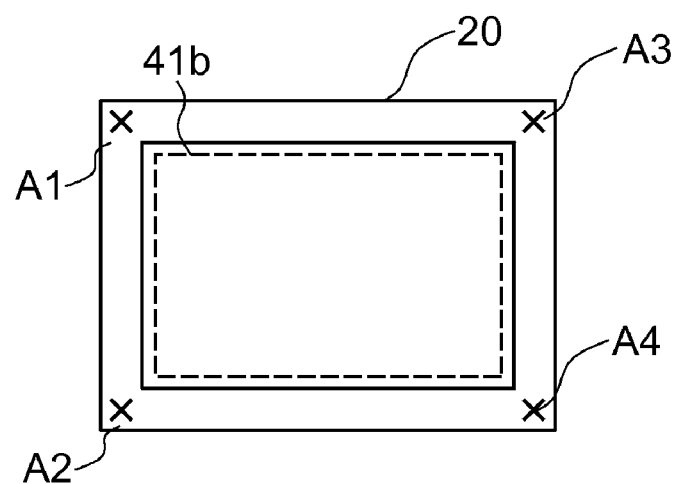
FIG. 23 is a schematic view illustrating some sensing points as a measure of discriminating the change of the surrounding's light.

Furthermore, since the surrounding's light is continuously changed, the light-spot image 20 may include at least a sensing point. By detecting color information of the sensing point, the change of the surrounding's light will be realized. For example, as shown in FIG. 23, four sensing points A1, A2, A3 and A4 are disposed outside the input field 41b, so that the influence of the light emitted from the image projecting system 40 is minimized. In a case that the change of the surrounding's light is too large, related parameters and critical values may be adjusted.

For achieving better correcting, setting or recognizing performance, a step of automatically optimizing photosensing parameters of the photosensing system 12 is optionally used. Firstly, a second frame (e.g. the reference frame 60) is inputted into the projection screen 50. Then, the second frame is captured by the photosensing system 12 while continuously adjusting the parameters of the photosensing system 12, thereby obtaining plural second images corresponding to different photosensing parameters. The relevant reference points of the second mages corresponding to the reference points of the second frame are recognized while recording the number of recognized relevant reference points. By searching a target image from the plural second images having a highest number of recognized relevant second reference points, an optimal photosensing parameter of the photosensing device corresponding to the target image is set.

In the above embodiments, the photosensing system 12 may includes a plurality of photosensing devices 10 as shown in FIG. 1. These photosensing devices 10 capture the projection screen 50 at different directions, thereby achieving omni-directional observation without any dead space. Moreover, the image projecting system 40 may include a plurality of image projectors. If the projection screen 50 is very huge, plural image projectors and plural photosensing devices 10 may be used to capture multiple sub-regions of the projection screen 50, thereby increasing the resolution of the projection screen 50. Examples of the image projectors include rear-type projectors. All of the data described in this context may be processed or recognized by the same data processing system or different data processing systems. Moreover, the projection screen 50 may be an active or passive screen having a planar, regularly curved or irregularly curved surface. An example of the active screen includes but is not limited to a cathode ray tube (CRT) monitor, a liquid crystal display, a plasma display panel or a rear-type projection screen. The passive screen includes for example a scattering screen of a front-type projector.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An input method of a pointer input system, said pointer input system comprising a data processing system, an image projecting system, a projection screen and a photosensing system, said input method comprising steps of:
    performing a setting procedure and a correcting procedure on said pointer input system to obtain a space conversion relationship and an over-bright position;
    inputting at least a light spot onto said projection screen;
    arranging at least a dual-band filter or a multi-band filter between said photosensing system and said projecting screen to filter off monochromic or poly chromic light captured by the photosensing system;
    capturing said light spot by said photosensing system, thereby obtaining a light-spot image;
    recognizing at least a relevant light spot of said light-spot image comprising the steps of:
        excluding said over-bright position from the light-spot image, and
        checking whether said light-spot image complies with a light-spot characteristic situation, thereby obtaining at least a light-spot data; and
    converting said at least a light-spot data into at least an input data of said data processing system according to said space conversion relationship.

2. The input method according to claim 1 wherein said light-spot characteristic situation is satisfied when a characteristic value is greater than a light-spot critical value, and wherein said characteristic value includes color intensity, brightness or gray scale.

3. The input method according to claim 1 wherein the step of recognizing said at least a relevant light spot of said light-spot image to obtain said at least a light-spot data includes a sub-step of incorporating the pixels complying with said light-spot characteristic situation and adjacent pixels in a same image block, wherein said image block is deemed as a non-light spot if the area of said image block is beyond a reference area range.

4. The input method according to claim 1 wherein said at least a light-spot data includes a light-spot position data, and wherein the step of recognizing said at least a relevant light spot of said light-spot image to obtain said at least a light-spot data includes sub-steps of:
    incorporating the pixels complying with said light-spot characteristic situation and adjacent pixels in a same image block;
    measuring characteristic values of respective pixels; and
    calculating a center of mass of said image block according to said characteristic values of respective pixels, thereby determining said light-spot position data, wherein said characteristic values are represented by at least three digital bits.

5. The input method according to claim 1 further comprising steps of:
    storing at least a light-spot data; and
    monitoring and tracking a continuous moving action and a relative position of said at least a light spot according to said light-spot data;
    wherein the step of obtain said at least a light-spot data includes sub-steps of:
    incorporating the pixels complying with said light-spot characteristic situation and adjacent pixels in a same image block;
    determining said moving direction of said at least a light spot according to said stored light-spot data if said image block is deemed as a light spot, and defining a terminal portion of said image block; and
    obtaining said light-spot data according to the color information of said terminal portion of said image block.

6. The input method according to claim 5 further comprising a step of constructing at least an anticipated light spot from said stored light-spot data by extrapolation algorithm, or constructing at least a compensated light spot from said stored light-spot data and said at least an anticipated light spot by interpolation algorithm.

7. The input method according to claim 1 wherein the size of said light-spot image is shrunk when compared with a reference image obtained in said correcting procedure, thereby enhancing the recognizing speed or wherein the pixels of said relevant light spot of said light-spot image are scanned in alternate rows or in alternate columns.

8. The input method according to claim 1 further comprising a step of deducing a region of interest of said light-spot image according to said space conversion relationship, wherein only said region of interest of said light-spot image is analyzed when said light spot is recognized.

9. The input method according to claim 1 further comprising a step of constructing at least a sensing point, and detecting color information of said at least a sensing point to discriminate whether any parameter of said pointer input system needs to be adjusted.

10. The input method according to claim 1 further comprising a step of automatically optimizing photosensing parameters of said photosensing system, which includes sub-steps of:
    inputting a second frame into said projection screen, said second frame including plural reference points;
    continuously adjusting said parameters of said photosensing system and capturing said second frame by said photosensing system, thereby obtaining plural second images corresponding to different photosensing parameters;
    recognizing relevant reference points of said second mages corresponding to said reference points of said second frame, and recording the number of recognized relevant reference points;
    searching a target image from said plural second images having a highest number of recognized relevant second reference points; and setting an optimal photosensing parameter of said photosensing system corresponding to said target image.

11. The input method according to claim 1 wherein said setting procedure further comprising steps of:
   inputting a first frame to said projection screen;
   capturing said first frame by said photosensing system, thereby obtaining a first image; and
   analyzing the color information of said first image, thereby realizing an over-bright position.

12. The input method according to claim 11 further comprising steps:
   inputting a second frame to said projection screen;
   capturing said second frame by said photosensing system, thereby obtaining a second image; and
   determining a light-spot critical value according to the color information of said second image excluding said over-bright position.

13. The input method according to claim 11 further comprising steps of:
   inputting a second frame to said projection screen;
   capturing said second frame by said photosensing system, thereby obtaining a second image;
   dividing said second image into plural sub-images, which have respective color information; and
   determining respective light-spot critical values of said sub-images according to the color information of said second image excluding said over-bright position.

14. The input method according to claim 11 further comprising a step of adjusting a signal-to-noise ratio of said photosensing system such that a peak value of a characteristic value of said first image excluding said over-bright position is smaller than a noise threshold value.

15. The input method according to claim 11 further comprising a step of automatically optimizing photosensing parameters of said photosensing system, which includes sub-steps of:
   inputting a second frame into said projection screen, said second frame including plural reference points;
   continuously adjusting said parameters of said photosensing system and capturing said second frame by said photosensing system, thereby obtaining plural second images corresponding to different photosensing parameters;
   recognizing relevant reference points of said second mages corresponding to said reference points of said second frame, and recording the number of recognized relevant reference points;
   searching a target image from said plural second images having a highest number of recognized relevant second reference points; and
   setting an optimal photosensing parameter of said photosensing system corresponding to said target image.

16. The input method according to claim 1 wherein said correcting procedure further comprising steps of:
   inputting at least a reference frame into said projection screen, said reference frame including plural reference points;
   capturing said reference frame by said photosensing system, thereby obtaining a reference image;
   recognizing relevant reference points of said reference image corresponding to said reference points of said reference frame according to a color critical value; and
   comparing the recognized relevant reference points with predetermined reference data, thereby discriminating a space conversion relationship between said projection screen and said photosensing system.

17. The input method according to claim 16 wherein said color critical value is obtained by the following sub-steps:
   inputting a first color frame into said projection screen, and capturing said first color frame by said photosensing system, thereby obtaining a first color reference image;
   determining a first color reference value according to the color information of said first color reference image;
   inputting a second color frame into said projection screen, and capturing said second color frame by said photosensing system, thereby obtaining a second color reference image;
   determining a second color reference value according to the color information of said second color reference image; and
   determining said color critical value according to said first color reference value and said second color reference value.

18. The input method according to claim 16 wherein said reference frame includes a checkerboard pattern, a block dot pattern or a cross dot pattern, and said input method further comprises a step of detecting a number of pixels per system frame of said data processing system and an aspect ratio of said system frame of said data processing system so as to discriminate the accuracy of said space conversion relationship.

19. The input method according to claim 16 wherein the step of inputting said reference frame into said projection screen includes a sub-step of adjusting the size of said reference frame and the location of said reference frame on said projection screen, and said input method further comprises a step of displaying said recognized relevant reference points on a monitor and adjusting the direction of said photosensing system according to said recognized relevant reference points.

20. The input method according to claim 16 further comprising a step of automatically optimizing photosensing parameters of said photosensing system, which includes sub-steps of:
   inputting a second reference frame into said projection screen, said second reference frame including plural second reference points;
   continuously adjusting said parameters of said photosensing system and capturing said second reference frame by said photosensing system, thereby obtaining plural second reference images corresponding to different photosensing parameters;
   recognizing relevant second reference points of said second reference images corresponding to said second reference points of said second reference frame, and recording the number of recognized relevant second reference points;
   searching a target image from said plural second reference images having a highest number of recognized relevant second reference points; and
   setting an optimal photosensing parameter of said photosensing system corresponding to said target image.

21. The input method according to claim 1 wherein said correcting procedure further comprising steps of:
   inputting at least a reference frame into said projection screen, said reference frame including plural reference points;
   capturing said reference frame by said photosensing system, thereby obtaining a reference image;
   dividing said reference image into plural sub-images, which have respective color critical values;

recognizing relevant reference points of said reference image corresponding to said reference points of said reference frame according to said color critical values; and comparing the recognized relevant reference points with predetermined reference data, thereby discriminating a space conversion relationship between said projection screen and said photosensing system.

22. The input method according to claim 21 wherein said color critical values are obtained by the following sub-steps:

inputting a first color frame into said projection screen, and capturing said first color frame by said photosensing system, thereby obtaining a first color reference image;

dividing said first color reference image into plural first sub-images, which have respective first color critical values;

determining said first color reference values according to respective color information of said first color reference image;

inputting a second color frame into said projection screen, and capturing said second color frame by said photosensing system, thereby obtaining a second color reference image;

dividing said second color reference image into plural second sub-images, which have respective second color critical values;

determining said first color reference values according to respective color information of said second color reference image; and determining said color critical values according to said first color reference values and said second color reference values.

23. The input method according to claim 21 further comprising a step of automatically optimizing photosensing parameters of said photosensing system, which includes sub-steps of:

inputting a second reference frame into said projection screen, said second reference frame including plural second reference points;

continuously adjusting said parameters of said photosensing system and capturing said second reference frame by said photosensing system, thereby obtaining plural second reference images corresponding to different photosensing parameters;

recognizing relevant second reference points of said second reference images corresponding to said second reference points of said second reference frame, and recording the number of recognized relevant second reference points;

searching a target image from said plural second reference images having a highest number of recognized relevant second reference points; and setting an optimal photosensing parameter of said photosensing system corresponding to said target image.

24. The input method according to claim 1 wherein said correcting procedure further comprising steps of:

inputting at least a reference frame into said projection screen, said reference frame including plural reference points;

successively capturing said reference frame by said photosensing system, thereby obtaining at least a reference image;

recognizing relevant reference points of said reference image corresponding to said reference points of said reference frame; and comparing the recognized relevant reference points with at least a predetermined reference data, thereby discriminating a space conversion relationship between said projection screen and said photosensing system, wherein said predetermined reference data complies with a specified coordinate system.

* * * * *

UNITED STATES PATENT AND TRADEMARK OFFICE
CERTIFICATE OF CORRECTION

PATENT NO. : 8,259,063 B2
APPLICATION NO. : 11/753983
DATED : September 4, 2012
INVENTOR(S) : Li-Wen Ting Page 1 of 1

It is certified that error appears in the above-identified patent and that said Letters Patent is hereby corrected as shown below:

Title Page:

Please change Item 73 the Assignee information from "Primax Electronics, Ltd., Taipei (TW)" to read "MICRO-NITS CO., LTD., Toufen Township (TW)."

Signed and Sealed this
Twenty-third Day of July, 2013

Teresa Stanek Rea
*Acting Director of the United States Patent and Trademark Office*